(No Model.) 3 Sheets—Sheet 1.
J. C. ECKSTINE.
STRAW STACKER.
No. 377,243. Patented Jan. 31, 1888.
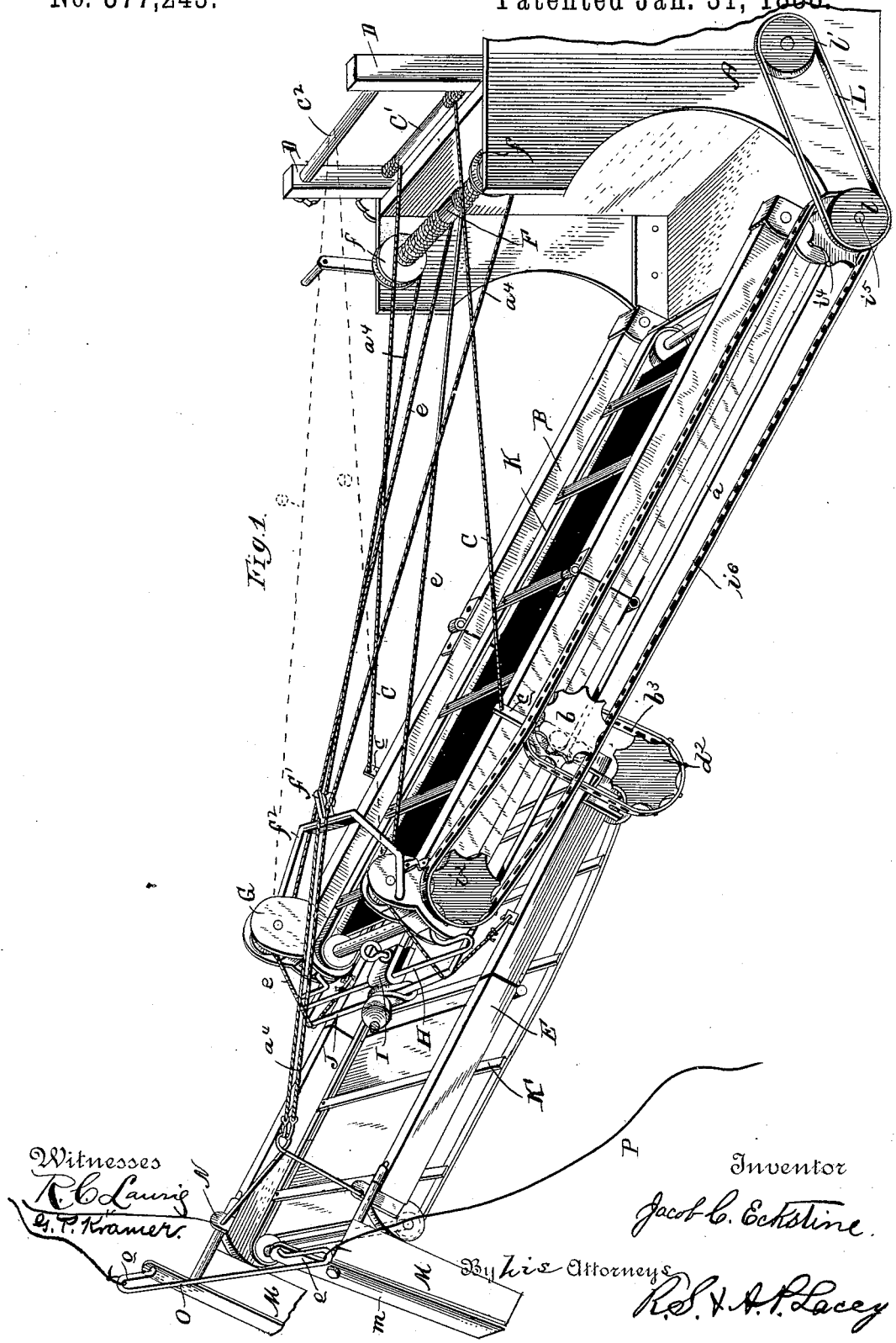
Witnesses
R. C. Laurie
G. P. Kramer.
Inventor
Jacob C. Eckstine.
By his Attorneys
R. S. & A. P. Lacey (No Model.) 3 Sheets—Sheet 2.
J. C. ECKSTINE.
STRAW STACKER.
No. 377,243. Patented Jan. 31, 1888.
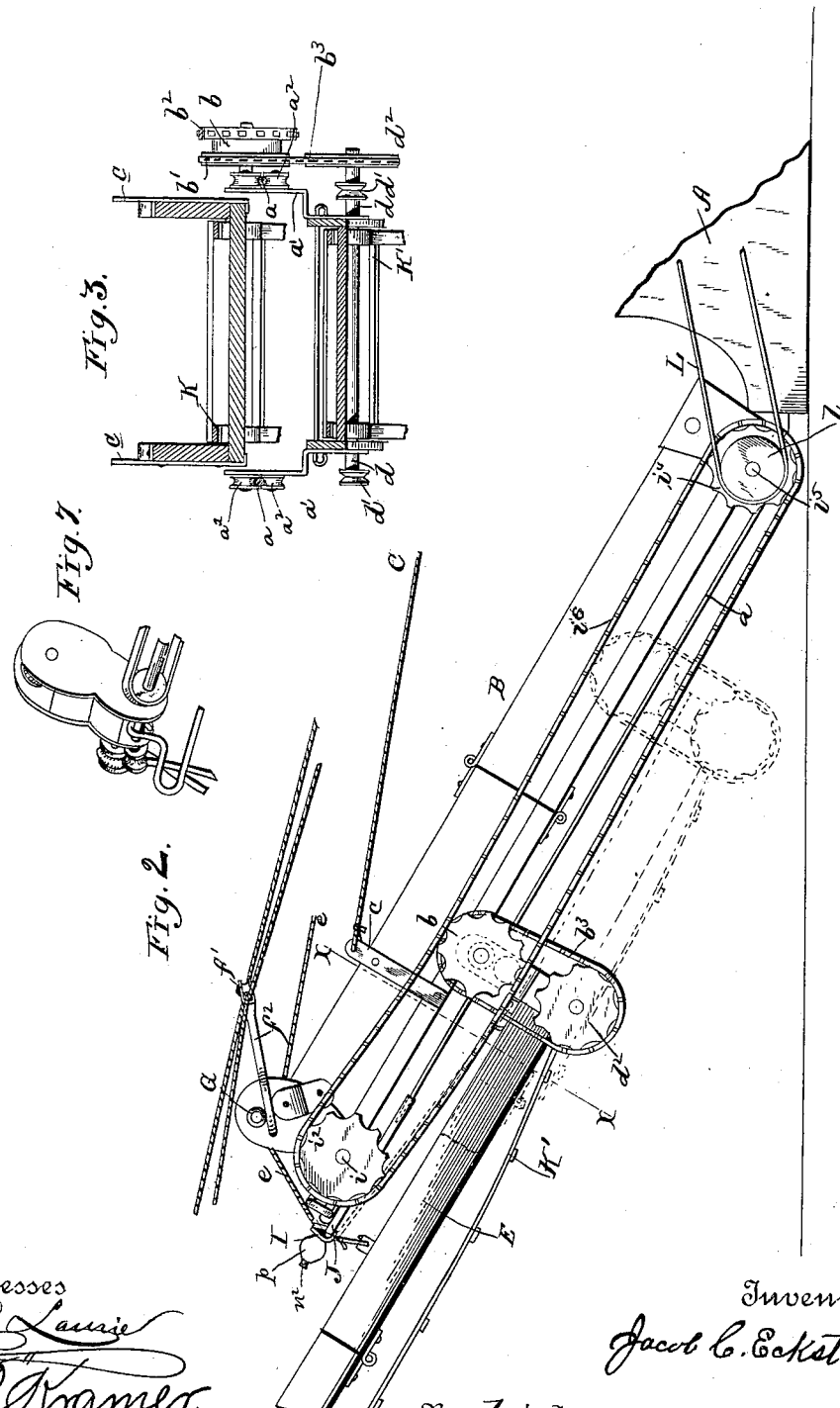
Witnesses
R. C. Laurie
G. P. Kramer
Inventor
Jacob C. Eckstine
By his Attorneys
R. S. & A. P. Lacey (No Model.) 3 Sheets—Sheet 3.
J. C. ECKSTINE.
STRAW STACKER.
No. 377,243. Patented Jan. 31, 1888.
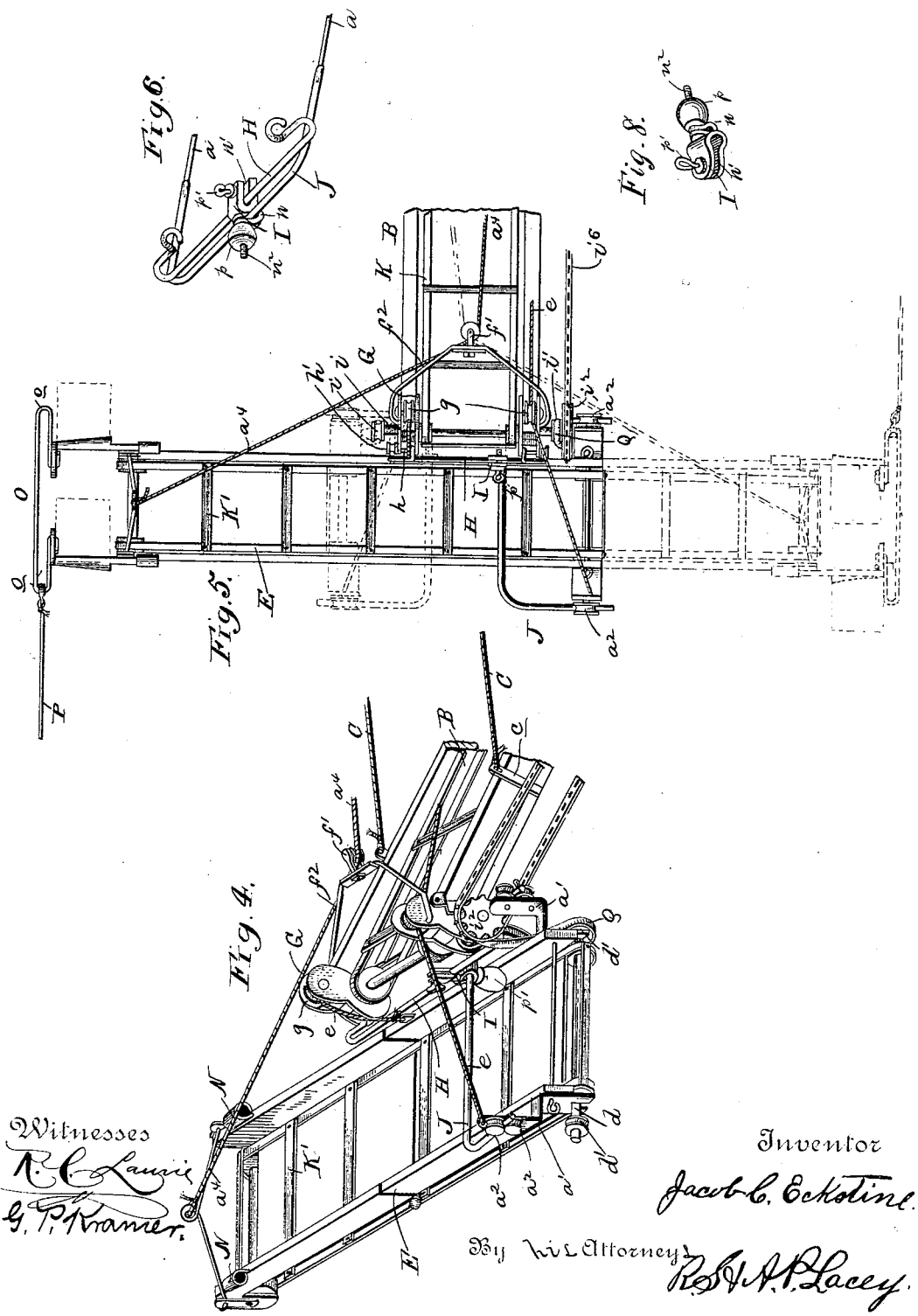

UNITED STATES PATENT OFFICE.

JACOB C. ECKSTINE, OF CHEWSVILLE, MARYLAND.

STRAW-STACKER.

SPECIFICATION forming part of Letters Patent No. 377,243, dated January 31, 1888.

Application filed July 23, 1887. Serial No. 245,115. (No model.)

*To all whom it may concern:*

Be it known that I, JACOB C. ECKSTINE, a citizen of the United States, residing at Chewsville, in the county of Washington and State of Maryland, have invented certain new and useful Improvements in Straw-Stackers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to straw-stackers, and has for its object the production of a device composed of a series of elevator-sections, two being shown—an inner section attached to and driven from the thrashing-machine and an outer section suspended from the inner section in such a manner that it can be adjusted to lengthen or shorten the elevator or be adjusted transversely of the inner section to deliver the straw to either the right or left; to provide a simple means for operating said sections, whereby they may be moved or slid past one another for lengthening or shortening the elevator; to provide a system of ropes and windlasses, one for each section of the elevator, for raising and lowering them together or independently and holding them in an adjusted position, to contrive a construction whereby the elevator-aprons of the sections may be connected so that motion imparted to one apron will be transmitted to the other apron and the sections still be free to be adjusted or moved over one another; to construct a system of devices compact in arrangement, whereby the outer elevator-section can be readily thrown out of alignment with the inner elevator-section and adjusted transversely thereof either to the right or left; and, lastly, to provide the outer or discharge end of the elevator with an adjustable or rocking chute vibrating from side to side for depositing the straw so that the ends thereof will overlap and interlock, thereby preventing the straw being readily carried off by the wind. I attain these results by the novel construction and combination of parts, which will be more fully hereinafter set forth and claimed, and shown in the annexed drawings, in which—

Figure 1 is a perspective view of the delivery end, the front portion being broken away, of a thrashing-machine and a straw-stacker embodying my invention attached thereto; Fig. 2, a side view, parts being broken away, of the elevator; Fig. 3, a transverse sectional view on the line X X of Fig. 2, looking to the right; Fig. 4, a detail perspective view of the outer end of the inner elevator-section and the outer elevator-section on an enlarged scale, showing the outer section adjusted transversely of the inner section; Fig. 5, a plan view of the outer portion of the inner elevator-section and the outer elevator-section, showing the latter adjusted to the right by full lines and to the left by dotted lines; Fig. 6, a sectional view of the bar and clamp at the end of the inner elevator-section and the bail which supports the side guide-bars; Fig. 7, a detail perspective view of a portion of the outer end of the inner section, showing the manner of securing the bar between the plates. Fig. 8 is a detail perspective view of the clamp which supports the bail at the end of the inner section of the elevator.

For convenience of illustrating the application of the straw-stacker the delivery end A of a thrashing-machine is shown only. To the lower corner is hinged or otherwise pivotally secured the inner section, B, of the elevator, which section has its outer end supported by the cords C, secured at one end to plates $c$, fastened to its sides, and having the opposite ends of the cords passed around the windlass C′, journaled in the standards D, fastened to and projected from the upper rear corner of the thrasher. The outer elevator-section, E, is suspended at its inner end beneath the section B by guide-bars $a$, extending along the sides of and secured at each end to the opposite ends of the inner section, B, brackets $a'$, projected from the sides of the outer section, and the grooved rollers $a^2$, journaled on the side of brackets $a'$ and embracing the guide-bars. The outer end of section E is supported by the cords $a^4$, which extend back and pass over drums $f$ on the windlass F, journaled between the sides of the thrasher. The cords $a^4$ cross and pass through the sheave $f'$, carried by the yoke $f^2$, and are thereby held from bearing down upon the straw being carried by the elevator. The cords or chains secured to the outer section, E, near its lower end pass over pulleys $g$, journaled between plates G, lapped alongside of and secured to the ends of the sides of the section B and extending back pass around windlass F.

To shorten the elevator the windlass F is turned so the cords $e$ pass off and permit the section E to gravitate on the guide-rods $a$, and to lengthen the elevator the cords $e$ are wound up on the windlass, which effects an upward movement of section E, as will be readily appreciated.

The bar H has eyes at each end, which permit the passage of the studs $h$, extending through the plates G, for securing the ends of said bar between them. The outer ends of studs $h$, which project beyond the plates some distance, have pulleys $h'$ mounted thereon, for a purpose hereinafter made known. The clamp I is double—that is, it is composed of two clamps, $n$ and $n'$, arranged at right angles to each other and provided with the set-screws $p$ and $p'$, respectively, having the bar H clamped by one and the bail J clamped by the other of the clamps. The guide-rods $a$ have their forward ends reduced and fitted in sockets in the ends of the bail, so they may be readily detached therefrom when it is desired to adjust the elevator for delivering to one side or the other, as shown in Figs. 4 and 5.

Each of the elevator-sections B and E is provided with carrier-aprons K and K', respectively, which pass over suitable pulleys or rollers at each end of the respective sections. The journals $d$ of the roller supporting the inner lower end of apron K' are extended at each end beyond the sides of the section E, and have pulleys $d'$ keyed thereon, for a purpose presently to be made known. One of the journals $d$ is extended beyond pulley $d'$ and has sprocket-wheel $d^2$ keyed thereto. One of the studs supporting the rollers $a^2$ on the same side as sprocket-wheel $d^2$ is projected and forms a journal for the double sprocket-wheel $b$, which is made up of two sprocket-wheels, $b'$ $b^2$, united so as to revolve together in different vertical planes. The sprocket-chain $b^3$ passes around and unites sprocket-wheels $b'$ and $d^2$ and causes them to revolve together. The journals $i$ of the roller supporting the outer end of apron K are extended on each side of the section B and have pulleys $i'$ keyed thereon, and the journals on the side with the sprocket-wheels, in addition to the pulley $i'$, are provided with sprocket-wheel $i^2$, around which and corresponding sprocket-wheel $i^4$ on the journals $i^5$ of the roller which supports the lower end of apron K passes the sprocket-chain $i^6$. The stacker is driven from any suitable source of power, preferably from the thrashing-machine, by the band L, passing around the band-pulley $l$, keyed to journals $i^5$, and around band-pulley $l'$, keyed to a projecting journal of the thrasher-operating mechanism. The sprocket-chain $i^6$ operates in the same plane as the sprocket-wheel $b^2$ of the double sprocket-wheel $b$, and in its travel it engages with the upper and lower sides of the sprocket-wheel $b^2$ and positively rotates the same, and through the gearing $b'$, $b^3$, and $d^2$ effects a movement of the carrier-apron K'.

The section E may be readily adjusted to any position without disturbing the relative arrangement of the parts $i^6$, $b'$, $b^3$, and $d^2$, as will be readily understood.

A chute comprising wings M, having their front portions bent substantially at right angles toward each other, forming the flanges $m$, has the upper ends of the wings journaled to brackets N, extending upward from the sides of the section E. The flanges $m$ are projected up above the pivotal support of the wings, and are connected by rod O, having cranks $o$ at each end. The rod may be operated from any suitable point for moving both wings simultaneously and in the same direction by the connection P for throwing the straw right and left, for distributing the straw over a large area, and having its ends interlocked or overlapped, so it cannot be readily separated by the wind and scattered about.

The sections of the elevator will be in alignment, as best shown in Figs. 1 and 2, when the straw is delivered from the elevator in line with the thrasher; but when it is desired to deliver the straw to one side or the other of the inner section of the elevator the sprocket-chain $b^3$ is dispensed with, the guide-rods $a$ are detached from the bail, which is arranged at right angles to the bar H, and held in such position by clamp I, and the section E is placed transversely of the section B to deliver to the right or left thereof, and is supported by having the arms of the bail J passed between the rollers $a^2$, and by the cords $e$ and $a^4$, as shown in Fig. 5, motion is imparted to apron K' from apron K by the endless band Q, passed around pulleys $i'$ and $d'$, whichever are adjacent, as will be readily understood from Figs. 4 and 5. Instead of having the two sets of cords $a^4$ and $e$ passing around the windlass F, one set or the other may pass around windlass $C^2$, journaled between standards D, so that each may be operated independently of the other.

The several windlasses will be provided with appropriate ratchets and pawls to hold them in an adjusted position and prevent retrograde movement.

The clamp $n'$ is provided with a threaded extension, $n^2$, on which the clamp $n$ is mounted and free to turn to any angle. When the set-screw $p$ is loosened, the clamp $n$ relaxes its grip on the bail J, which can be adjusted to the right or left, and the clamp can be turned to the proper angle relative to clamp $n'$. After the parts are properly adjusted the set-screw $p$ is retightened and holds them securely in position. The clamp I can be adjusted on rod H by loosening set-screw $p'$, and held when adjusted by retightening the said set-screw $p'$.

Having thus described my invention, what I claim, and desire to secure by Letters Patent, is—

1. The combination, with the elevator composed of two sections, the bar H, the bail J, and the clamp I, of the brackets $a'$, the rods $a$, the pairs of rollers $a^2$, and the cords $e$ and $a^4$, substantially as and for the purpose described.

2. The combination, with the section B and the section E, of the bar H, bail J, and the double clamp I, substantially as described, for the purpose specified.

3. The combination, with the inner section of the elevator having the journals of the rollers supporting the apron extended and provided with sprocket-wheels, and the sprocket-chain passing about said sprocket-wheels, of the outer section, means for adjusting it for lengthening and shortening the elevator, the journal of the roller supporting the inner end of the apron of said outer section being extended and provided with a sprocket-wheel, and means for imparting motion to said sprocket-wheel from the sprocket-chain at any and all adjusted positions of the outer section, composed of the double sprocket-wheel, having one of the sprocket-wheels engaged by the aforesaid chain, and the sprocket-chain $b^3$ passing around and connecting the other sprocket-wheel with the sprocket-wheel on the journal of the roller which supports the inner end of the apron of the outer section.

4. The combination, with the inner section, the sprocket-chain $i^6$, and the side guide-rods, of the outer section having brackets, the pairs of rollers, the sprocket-wheel $d^2$, the double sprocket-wheel $b$, and the sprocket-chain $b^3$, substantially as described, and for the purpose specified.

5. The combination, with the inner section having the journals of the roller supporting the outer end of the apron extended at each end, the pulleys mounted on said journals, the rod, the clamp, and the bail, of the outer section having the journals of the roller supporting the inner end of the apron extended on each side, the endless band, the brackets, and the pairs of rollers carried by the brackets, substantially as set forth.

6. The combination of the inner section pivotally supported at its lower end, the cords C, and the windlass for holding its outer end at an adjusted position, the side guide-rods, the outer section adapted to slide on said guide-rods, cords $e$, attached to the outer section and passing over the end of the inner section, and windlass F, supported independently of the sections for adjusting and holding the outer section in an adjusted position, and cords $a^4$, attached to the end of the outer section and having their inner ends connected with the windlass F, substantially as set forth.

7. The combination, with the elevator-section B and the elevator-section E, of the side rods, $a$, having reduced ends, the bail J, having sockets in its ends to receive the ends of the rods $a$, and the brackets $a'$, having rollers $a^2$, for supporting the inner end of section E, substantially as described.

8. The combination, with the elevator, of the chute composed of wings pivoted at one end, and the rod connecting the wings for operating both simultaneously, substantially as set forth.

9. The combination, with the elevator, of the chute composed of wings pivoted at one end and having flanged portions, which flanges project beyond the pivotal supports of the wings, and the rod connecting said extended flanges, substantially as specified.

10. The combination, with the elevator, of the chute composed of wings pivotally supported at their upper ends, and the rod having cranks at each end uniting the wings for operating them simultaneously, substantially as set forth.

In testimony whereof I affix my signature in presence of two witnesses.

JACOB C. ECKSTINE.

Witnesses:
WM. KEALHOFER,
C. A. LITTLE.